P. W. Reinshagen,
Shaft Coupling.
No. 96,962. Patented Nov. 16, 1869.
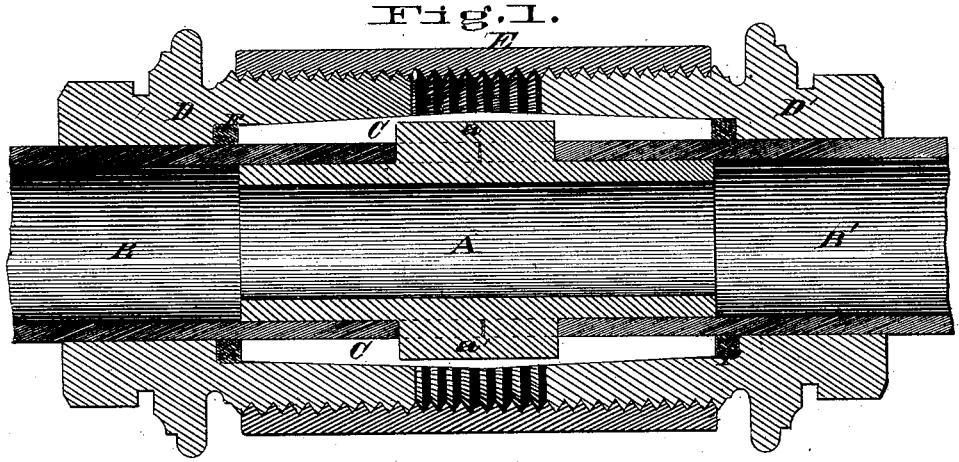
Fig. 1.
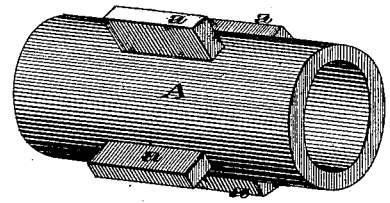
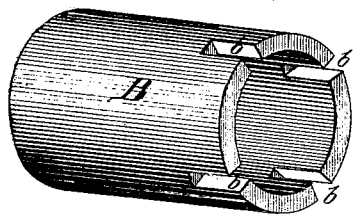 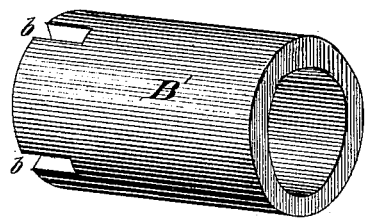
Fig. 2.
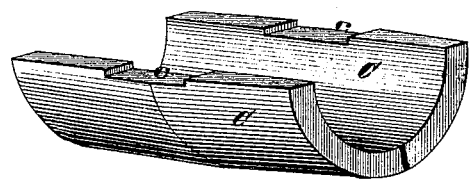
Attest.
Charles Pickel
J. B. Lord
Inventor:
Peter W. Reinshagen
By Frank Millward
Attorney

United States Patent Office.

PETER W. REINSHAGEN, OF CINCINNATI, OHIO, ASSIGNOR TO HIMSELF AND JOHN H. BUCKMAN, OF SAME PLACE.

Letters Patent No. 96,962, dated November 16, 1869.

IMPROVED COUPLING FOR HOLLOW SHAFTS.

The Schedule referred to in these Letters Patent and making part of the same.

*To all whom it may concern:*

Be it known that I, PETER W. REINSHAGEN, of Cincinnati, Hamilton county, State of Ohio, have invented certain new and useful Improvements in Couplings for Hollow Shafts; and I do hereby declare the following to be a sufficiently full, clear, and exact description thereof, to enable one skilled in the art to which my invention appertains, to make and use it, reference being had to the accompanying drawings, making part of this specification.

My invention is designed and adapted for hollow shafting only, and consists of certain devices which serve to connect the shafts to be coupled firmly together, and serve to obviate the necessity of chasing-screws on the ends of the shafts, and also prevent the indentation or collapsing of the hollow shafts by the act of securing the coupling.

In the accompanying drawings—

Figure 1 is an axial section of a hollow shaft-coupling, embodying my invention.

Figure 2 exhibits detached perspective views of those parts not clearly shown in fig. 1.

A is an interior bush, which fits snugly into the ends of the hollow shafts B B'.

The bush A is formed with two or more wings, *a*, and the ends of the shafts B B' are provided with slots *b*, to fit the said wings.

The bush A serves to prevent the indentation or collapsing of the shafts when the outer coupling (hereafter explained) is tightened, and the wings *a*, of the bush, in connection with the slots *b*, serve to connect the shafts B B' together, so as to prevent displacement by twisting or turning.

To prevent longitudinal displacement, or the drawing of the shafts, one from the other, and to force the shafts B B' tightly on to the bush A, I provide an exterior coupling, composed preferably of segments C, nuts D D', and sleeve E.

The segments C are of a double conical form, as shown, and are fitted over the shafts B B', being cut away at C to fit between the wings *a*.

The fitting of the segments C over the wings *a*, by means of notches *c*, serves to locate the exterior coupling in the proper position with relation to the junction of the shafts B B'. This feature, however, can be dispensed with if necessary, in the use of an exterior coupling different from the one described, the wings being then made "flush" with the exterior of the shafts B B'.

The conically-bored nuts D D' fit over the shafts B B' and segments C, and are threaded, to fit the exterior sleeve E.

It will be seen that the act of screwing the nuts D D' together, in the bush E, serves to crowd the segments C tightly on to the shafts B B', and force the latter to hug the interior bush A, and thus connect the shafts firmly together.

If the shaft-journals are oiled from the inside, India-rubber rings F F' may be inserted, to prevent the escape of oil through the coupling.

I claim herein as new, and of my invention—

1. The winged bush A *a a*, in the described connection with the slotted or notched shafts B B', arranged and operating substantially in the manner and for the purpose set forth.

2. In combination with the elements of the preceding clause, the conical notched segments C *c*, nuts D D', and sleeve E, constructed and operating substantially in the manner and for the purpose explained.

In testimony of which invention, I hereunto set my hand.

P. W. REINSHAGEN.

Witnesses:
FRANK MILLWARD,
F. B. LORD.